United States Patent
Taylor et al.

(10) Patent No.: US 8,705,022 B2
(45) Date of Patent: Apr. 22, 2014

(54) NAVIGATION SYSTEM USING BOTH GPS AND LASER REFERENCE

(75) Inventors: Arthur Taylor, Boulder, CO (US); Nicholas C. Talbot, Ashburton (AU)

(73) Assignee: Trimble Navigation Limited, Sunnyvale, CA (US)

( * ) Notice: Subject to any disclaimer, the term of this patent is extended or adjusted under 35 U.S.C. 154(b) by 156 days.

(21) Appl. No.: 11/582,150

(22) Filed: Oct. 17, 2006

(65) Prior Publication Data
US 2007/0052950 A1    Mar. 8, 2007

Related U.S. Application Data

(63) Continuation-in-part of application No. 10/890,037, filed on Jul. 13, 2004.

(51) Int. Cl.
*G01B 11/26*    (2006.01)

(52) U.S. Cl.
USPC ..................................................... 356/139.01

(58) Field of Classification Search
USPC ............ 356/3.01–3.15, 4.01–4.1, 5.01–5.15, 356/6–22, 28, 28.5, 139.01–139.1
See application file for complete search history.

(56) References Cited

U.S. PATENT DOCUMENTS

| | | | |
|---|---|---|---|
| 4,277,170 A | | 7/1981 | Miles |
| 5,077,557 A | * | 12/1991 | Ingensand ........................ 342/52 |
| 5,268,695 A | | 12/1993 | Dentinger et al. |
| 5,471,218 A | * | 11/1995 | Talbot et al. ............. 342/357.36 |
| 5,612,883 A | * | 3/1997 | Shaffer et al. ................. 701/300 |
| 5,652,592 A | | 7/1997 | Sanderford |
| 5,848,485 A | | 12/1998 | Anderson et al. |
| 5,949,371 A | | 9/1999 | Nichols |
| 6,259,403 B1 | | 7/2001 | Nichols |
| 6,433,866 B1 | * | 8/2002 | Nichols ...................... 356/141.1 |
| 2002/0027007 A1 | | 3/2002 | Ohtomo et al. |
| 2002/0060788 A1 | | 5/2002 | Ohtomo et al. |
| 2002/0108761 A1 | | 8/2002 | Ohtomo et al. |
| 2003/0137658 A1 | * | 7/2003 | Ohtomo et al. ............ 356/141.4 |
| 2006/0012777 A1 | | 1/2006 | Talbot et al. |
| 2006/0044546 A1 | * | 3/2006 | Lewin et al. ................. 356/4.04 |

OTHER PUBLICATIONS

Peter S. Maybeck, "Stochastic models, estimation, and control" vol. 1, Academic Press, A subsidiary of Harcourt Brace Jovanovich, Publishers, 1979.
Larry J. Levy, "The Kalman Filter: Navigation's Integration Workhorse", The KF: Navigation's Integration Workhorse, 1997.
Greg Welch and Gary Bishop, "An Introduction to the Kalman Filter", UNC-Chapel Hill, TR 95-041, Apr. 5, 2004.
Office Action pertaining to Chinese Application No. 200780038767.1 issued Jun. 23, 2010.
Office Action as it relates to Chinese Patent Appln. No. 2007800387671 dated Nov. 30, 2010.

(Continued)

*Primary Examiner* — Luke Ratcliffe
(74) *Attorney, Agent, or Firm* — Dinsmore & Shohl LLP

(57) ABSTRACT

A machine control system uses a laser system and global navigation satellite system to determine the position of the machine. The laser system has a laser detector positioned in a known and fixed relationship with the nominal phase center of a global navigation satellite antenna. The laser detector receives laser light transmitted from a laser transmitter. The outputs of the laser system and the global navigation satellite system are used together to determine the position of the transmitter prior to being used to determine the position of the machine.

23 Claims, 8 Drawing Sheets

(56) References Cited

OTHER PUBLICATIONS

Office Action pertaining to Chinese Application No. 200780038767.1 issued Oct. 29, 2012.

Office Action pertaining to U.S. Appl. No. 12/051,508 dated Mar. 2, 2009.

* cited by examiner

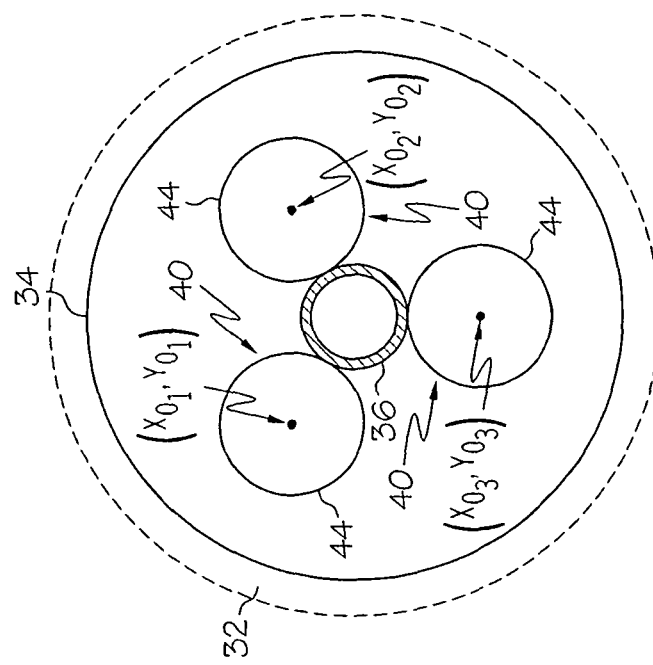
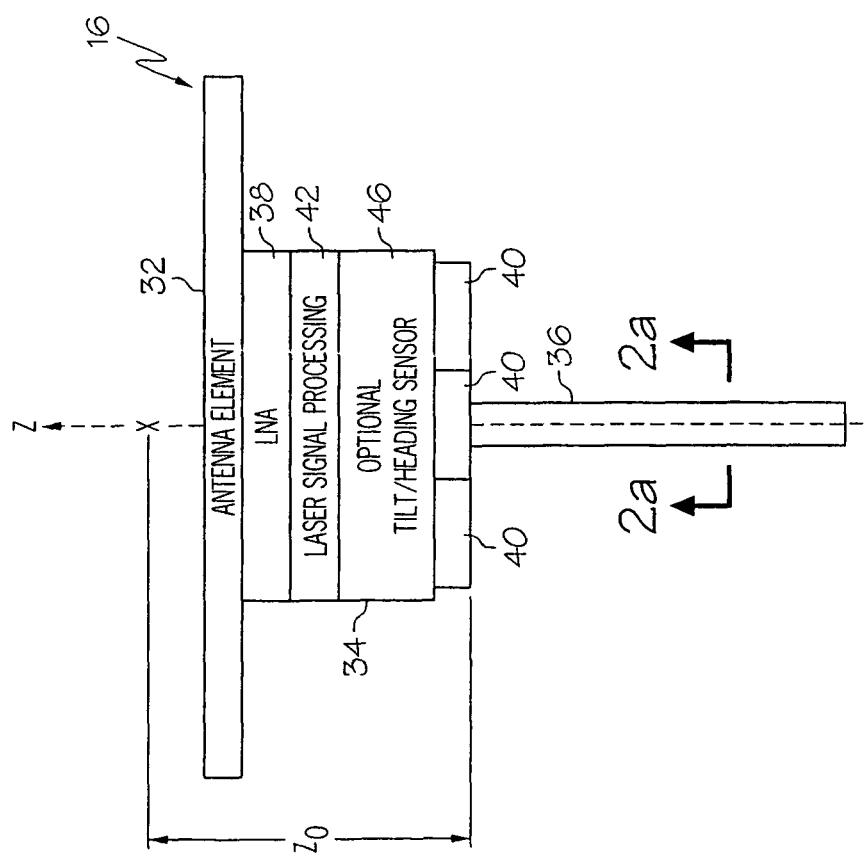
FIG. 2a
FIG. 2

NAVIGATION SYSTEM USING BOTH GPS AND LASER REFERENCE

CROSS-REFERENCE TO RELATED APPLICATIONS

This is a continuation-in-part of copending U.S. patent application Ser. No. 10/890,037, filed Jul. 13, 2004.

STATEMENT REGARDING FEDERALLY SPONSORED RESEARCH OR DEVELOPMENT

Not applicable.

BACKGROUND OF THE INVENTION

The current invention relates to position tracking and machine control systems and, in particular, to a combination of a laser system and a global navigation satellite system to track the position of a machine and to provide accurate control of the machine based on the tracking information.

Global navigation satellite systems (hereinafter collectively referred to as GNSS), like GPS, and GLONASS, have been used extensively to determine position coordinates. Such position coordinates can be used in surveying operations, and for automated control of mobile units. In the future, the European GALILEO system will have similar capabilities. An autonomous navigational system that includes a satellite receiver and a navigational computer can achieve a 10-meter level of accuracy in determining the position of a mobile unit using solely the satellite signals. Differential navigational systems that utilize differential corrections in addition to the satellite signals can determine the positional information to within a meter range of accuracy. Real-time kinematic (RTK) navigational systems that are capable of utilizing both code and carrier information transmitted from such satellites can achieve centimeter level accuracy.

While such GNSS systems are capable of monitoring the movement of mobile equipment and operating as a part of a system that controls the operation of such equipment, such as for example graders and other types of earthmoving equipment, global navigation satellite systems cannot operate effectively when satellites are blocked or partially blocked from view. Optimally, such global navigation satellite systems receive data from all satellites in view and calculate the position of the receiver based all satellites. Such systems are capable of operating when receiving transmissions from only four satellites, or when satellite geometry is weak (the geometric dilution of precision is high), however system positioning accuracy and performance will degrade. It is clear that when fewer than four satellites are being received, or when more than four satellites are tracked but the satellite geometry is weak, the control of the system must be achieved in an alternative manner. Further, in some instances, even when transmissions from five satellites are received, the accuracy achievable is less than desired.

SUMMARY OF THE INVENTION

To deal with those instances when signals from satellites are being obstructed, or when satellite positions prevent accurate position determination, a laser based positioning system can be arranged to provide supplemental information as to machine position. For example, if a motorgrader is about to travel under an overpass, it can be anticipated that the motorgrader system will lose sight of a number of the satellites. Since global navigation satellite systems operate with the receiver receiving on a line-of-sight basis, it should be anticipated that there will be a significant loss of satellite reception. To compensate for such loss, and for the loss of position data, a supplemental position information source, such as a stationary laser transmitter, cooperates with a laser receiver on the machine to determine machine position. The stationary laser transmitter effectively takes the place of a blocked satellite, allowing the control of the motorgrader to continue, unaffected, as the machine moves under the overpass and back into a position where it has a clear view of all of the satellites.

Since the position of the machine is determined in part with regard to the laser transmitter, it is important for the positioning system to determine the position of the laser transmitter in the same coordinate system as that in which the positioning system operates when under global navigation satellite system control. While it is possible to determine in advance the position of the laser transmitter using manual surveying techniques, it will be appreciated that this may slow down the operation of the positioning system and present opportunities for errors to be made, as well.

The present invention contemplates a combination laser system and global navigation satellite positioning system that allows a user to realize high precision control of mobile units, including high precision machine control, without necessitating an extensive set up procedure. The positioning system comprises a laser transmitter, an optical sensor, a GPS receiver, and a device receiving and utilizing the signals from the optical sensor and the GPS receiver. The laser transmitter projects at least one laser beam that rotates about a generally vertical axis. The GPS receiver, including a GPS antenna, determines the position of the antenna. The optical sensor may be coaxial with, or displaced a small distance from, the phase center of the GPS antenna. Alternatively the optical sensor may be simply positioned a fixed position with respect to the phase center of the GPS antenna. The optical sensor receives the laser beam. The device receives signals from the GPS receiver and signals from the optical sensor to determine the position of the transmitter. Thereafter, the device utilizes signals received from the optical sensor to improve the estimate of position based on the signals from the GPS receiver. This positioning system may determine the position of a machine and then be used for controlling the machine by providing a control signal. The GPS data and the optical sensor data may advantageously be combined in a Kalman filter.

Accordingly, it is an object of the present invention to provide a system for determining the position of a machine and controlling the machine in which the operation of the system is facilitated.

BRIEF DESCRIPTION OF THE DRAWINGS

The aforementioned advantages of the present invention, as well as additional advantages thereof, will be more clearly understood hereinafter as a result of a detailed description of a preferred embodiment of the invention when taken in conjunction with the following drawings, wherein like elements are indicated by like symbols.

FIGS. 2-4 depict various embodiments of combination laser detector and global navigation satellite antennas according to the present invention;

DETAILED DESCRIPTION OF THE VARIOUS EMBODIMENTS

Figure 1:
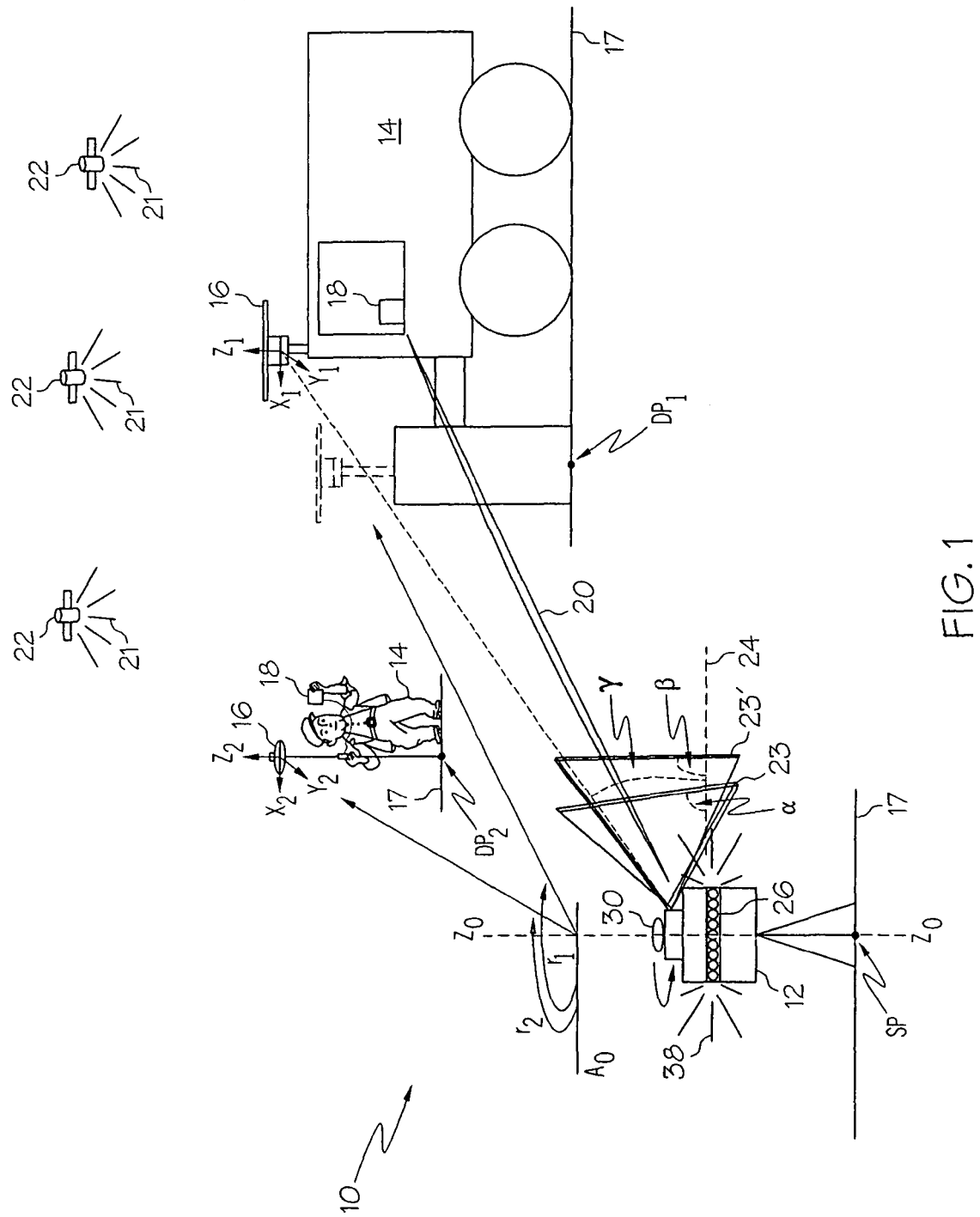
FIG. 1 shows a position tracking and control (PTC) system according to one embodiment of the present invention wherein the PTC system comprises a laser system, one or more mobile units, each having a combination laser detector and global navigation satellite (CLDGNS) antenna and an associated control system, and a communication link.

The present invention can be best understood by reference to FIG. 1 which depicts a position tracking and control (PTC) system 10. The PTC system 10 comprises a laser transmitter system 12, one or more mobile or rover units 14, each having a combination laser detector and global navigation satellite (CLDGNS) antenna 16 and an associated control system 18, and having a transmitter for establishing a communication link 20, preferably a radio link. Signals 21 from a plurality of global navigation satellites 22 orbiting the earth, such as GPS, GLONASS, GALILEO, and combinations thereof, are received by the CLDGNS antenna 16 so that the coordinates of dynamic points in a plot of land 17, such as points indicated as $DP_1$, and $DP_2$, can be determined to a centimeter level of accuracy by the control system 18. Control system 18 includes a microprocessor or other computing hardware configured to process data from the antenna 16 to provide an estimate of the position of the antenna 16.

Millimeter level of accuracy in determining the position of the dynamic points $DP_1$, and $DP_2$ relative to each CLDGNS antenna 16 is provided by the control system 18 which uses information provided by the laser transmitter 12 in its coordinate (x, y, z) position computation in addition to signals received from satellites 22. In one embodiment, the laser transmitter 12 provides at least two diverging or fan-shaped beams 23 and 23' that rotate continuously about a vertical axis $Z_0$ at a uniform rate above a stationary point SP in the plot of land 17. The fan-shaped beams 23 and 23' project from the laser system 12 in non-vertical planes, such that the first fan beam 23 will intersect an arbitrary horizontal reference plane 24 at an angle α, and the second fan shaped beam 23' will intersect the horizontal reference plane at an angle β. Dynamic point $DP_1$, may be a working element on a machine, such as a grader blade, while dynamic point $DP_2$ may be a point at the bottom of a manually positioned mast being moved about by a surveyor.

It is to be appreciated that the fan-shaped beams 23 and 23', if rotated at a constant speed about a vertical axis, will successively activate (with some delay of time therebetween) at least one optical sensor 44 (FIGS. 2 and 3) of each CLDGNS antenna 16. Further, it is to be appreciated that in the embodiment of FIG. 1, the time delay between activating the optical sensor 44 by the fan-shaped beams 23 and 23' will increase or decrease as the relative position of a CLDGNS antenna 16 moves above or below the horizontal reference plane 24, respectively. It is to be appreciated that the CLDGNS antenna 16 can be initialized to any arbitrary horizontal reference plane 24 simply by selecting and entering into the control system 18 a detection time delay. Additionally, it is to be appreciated that any detected change by the CLDGNS antenna 16 in the detection time delay is related to an angle γ, which is the angle at which a straight line passing through the optical sensor 44 (FIGS. 2-4) of the CLDGNS antenna 16 and the point of emanation of the fan-shaped beams 23 and 23' meets the selected arbitrary horizontal reference plane 24.

As mentioned above, angles α and β are constants. Angle γ is determined by sensing the timing between the illumination of the sensor 44 by the beams 23 and 23'. The higher the sensor 44, the greater the delay. It will be apparent that fluctuation in the rotation speed of the fan-shaped beams 23 and 23' will introduce short term, transient errors. To minimize such errors, the control processor 18 may be provided with the rotation speed of the laser system 12 via the communication link 20. The rotation speed may, however, be phase locked to a crystal oscillator, providing sufficient accuracy. Accordingly, knowing the rotation speed, the control system 18 can compute the value of angle γ arithmetically from the detected time delay between illumination by the beams 23 and 23', and thus the elevation angle of the optical sensor in the CLDGNS antenna 16 above the reference horizontal plane 24 is determined.

In another embodiment, the laser transmitter 12 is further provided with a plurality of light sources which are strobed at the same point in time during each rotation of the beams 23 and 23'. Beacon 26 provides a simultaneous 360° flash 38 at a different wavelength than the fan shaped beams 23 and 23'. By orientating the laser transmitter 12 such that the beacon 26 flashes as the mid point between the fan-shaped beams 23 and 23' passes a known true heading $A_0$, the control system 18 can also compute a relative bearing to the laser transmitter 12 from the time delay between detecting the signal 38 of the beacon and detecting the fan-shaped beams 23 and 23'.

In still another embodiment, the laser system 12 is provided with a global navigation satellite system (GNSS) receiver 30. The GNSS receiver 30 can receive and compute its position from the signals 21 provided by the global navigation satellites 22. A detailed discussion of how to determine a location from such signals is disclosed by U.S. Pat. No. 6,433,866, also assigned to Trimble Navigation, LTD, the disclosure of which is herein incorporated fully by reference.

The control system 18 in addition to computing its own position (computed from the detected satellite signals received and provided by the CLDGNS antenna 16), may also be provided also with the known and fixed position of the laser system 12. Using the information provided by the laser transmitter 12 for correlation and error correcting, the control system 18 can then compute the coordinate (x, y, z) position of any dynamic point relative to the CLDGNS antenna 16 to a high degree of accuracy. A more detail discussion of the computations performed by the control system 18 is disclosed below.

It is to be appreciated that the PTC system 10 provides a number of benefits to a potential mobile user by integrating a laser detector and a global navigation satellite antenna. For example, the CLDGNS antenna 16 costs less than separate laser detectors and global navigation satellite antennas because the integrated CLDGNS antenna requires only one set of packaging, and can utilize shared circuitry and wiring, computer memory and processing, and a common power supply. Other benefits are disclosed with reference made to FIGS. 2-4 which illustrate various embodiments of the combination laser detector and global navigation satellite antenna according to the present invention.

FIG. 2 illustrates diagrammatically one embodiment of a CLDGNS antenna 16 which provides an antenna element 32 mounted to an electronic housing 34, which in turn is mounted to an end of an elongated support 36, such as a mast. Within the housing 34, the antenna element 32 is coupled to a low noise amplifier (LNA) 38, and a laser detector 40 is coupled to a laser signal processor 42. The laser detector 40 may include a number of optical sensors 44 placed around the periphery of the housing 34. The optical sensors 44 face generally downward and outward. In this orientation, at least one of the optical sensors 44 will detect the fan-shaped beams 23 and 23' from the laser system 12, and two or more optical sensors 44 will detect the fan-shaped beam some of the time. Each optical sensor 44 can be read independently and its position calculated by the control system 18.

In the illustrated embodiment of FIG. 2, three optical sensors 44 are provided, and in other embodiments more may be included to improve laser detection, if desired. In such embodiments, with the relative positions $X_0$, $Y_0$, and $Z_0$ of each optical sensor 44 to the nominal phase center x of its respective antenna element 32 being known, transposing the detected laser position of each optical sensor 44 to the nominal phase center x of the antenna element 32 is easily computed arithmetically by the control system 18.

The difference in the detected elevation between at the three optical sensors 44 provides an indication of tilt, which in turn may be used by the control system 18 to compensate for errors that would otherwise result in the calculated position of $DP_1$, and $DP_2$. Additionally, although the antenna tilt angle is important for adjusting the detected laser heights of each optical sensor 44 to the nominal phase center x of the associated antenna element 32, these changes in detected laser heights can also be used to help determine the orientation of the device (such as a grader/bulldozer blade) to which the CLDGNS antenna 16 may be connected. However, if desired, a tilt/heading sensor 46 may be further included in the packaging of the CLDGNS antenna 16 to simplify further the compensation for tilt, error correcting, and device orientation determination.

Figure 3A:
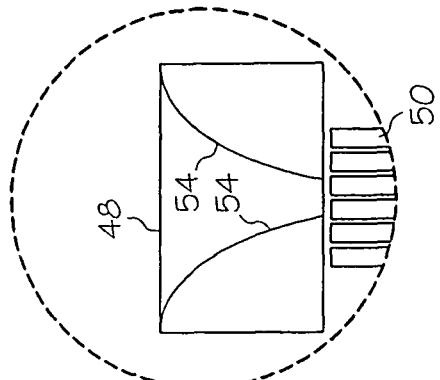
Figure 3B:
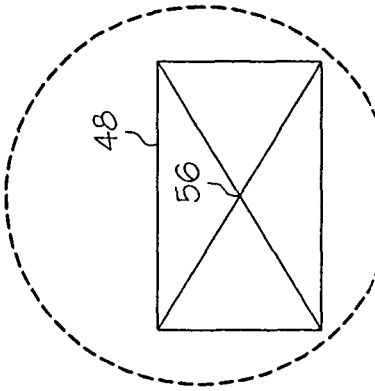
Figure 3:
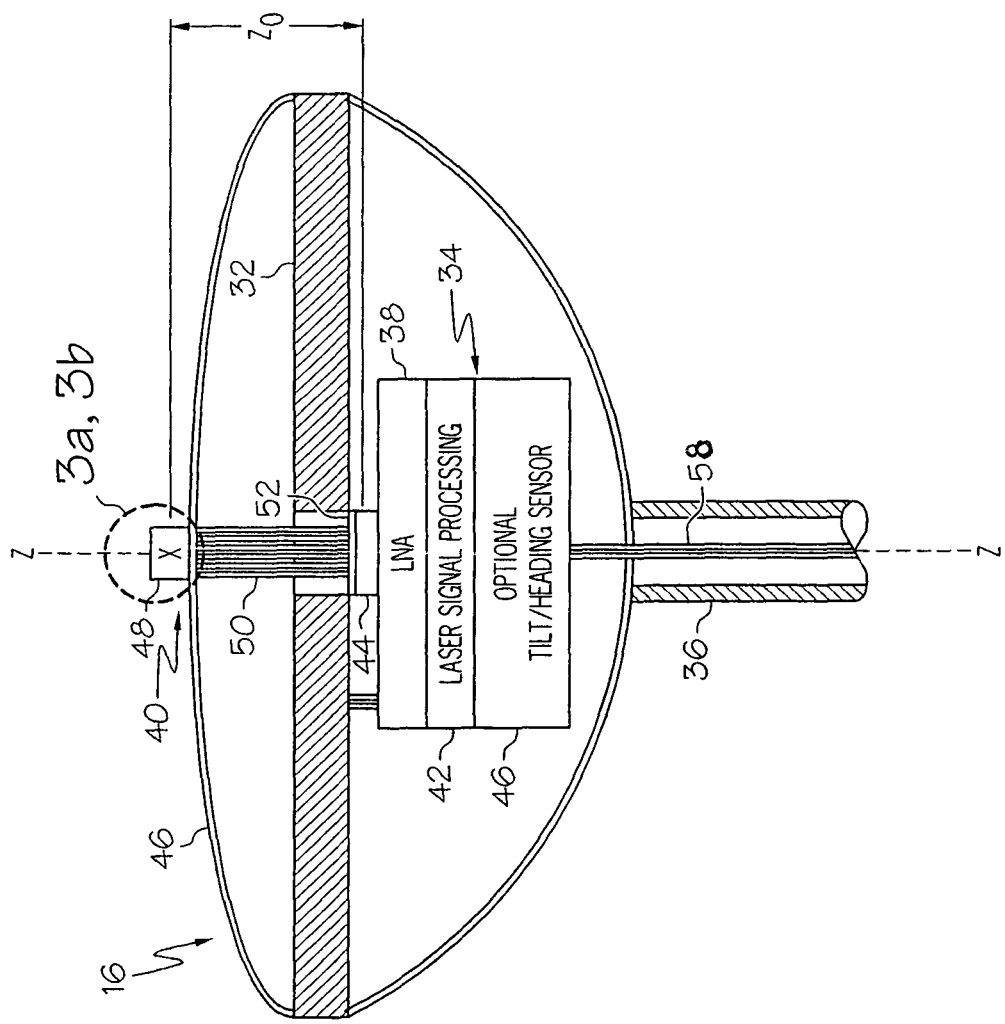

In another embodiment of the CLDGNS antenna 16, illustrated by FIG. 3, the electronic housing 34 and the antenna element 32 are protected by a radome 46. A fiber optic pick-up 48 of the laser detector is positioned on the top of the radome 46. The fiber-optic pick-up 48 is small, about 0.25 inches (6 mm) in diameter, as it only needs to collect enough energy to activate the optical sensor 44. The non-metallic fiber optic pick-up 48 is orientated along the Z axis, aligned vertically with the nominal phase center x of the antenna element 32. The laser detector also includes optical fiber 50 coupling the fiber optic pick-up 48 to the optical sensor 44. In this embodiment, the optical sensor 44 is positioned below the antenna element 32. A filter 52 may be optionally provided to filter out light noise received by the fiber optic pick-up 48. This improves the sensitivity of the optical sensor 44 to the energy of the fan-shaped beams 23 and 23' (FIG. 1). If desired, the optical sensor 44 may be moved upward and positioned substantially directly beneath the fiber-optic pick-up 48, above the antenna element 32.

In one embodiment, the fiber optic pick-up 48 comprises a circularly symmetric hyperbolic mirrored surface 54 (FIG. 3a) that catches light from 360 degrees, and reflects it to the optical sensor 44, via the optical fibers 50. In another embodiment, the fiber optic pick-up 48 may comprises a TIR prism 56 (FIG. 3b) which redirects the laser energy to the optical sensor 44, via optical fiber 50. The use of a total internal reflection (TIR) prism 56 requires no metallic coatings to ensure reflectivity, thereby removing all metal from above the antenna element 32. Since the metallic and semi-metallic portions of the optical sensor 44 are located below the antenna element 32, they will not adversely affect the ability of the antenna 16 to pick up the relatively weak satellite signals 21. Cabling 58 is provided through the support 36 to connect the output of the CLDGNS antenna 16 to the control system 18 (FIG. 1).

In yet another embodiment, illustrated by FIG. 4, one or more sensors 60 are located below the electronics housing 34, spaced along the support 36. This arrangement for the sensors 60 has the advantage of not interfering with reception, and also of not affecting the location of the nominal phase center x of the antenna element 32. Each sensor 60 may comprise a circularly symmetric hyperbolic mirrored surface or a prism. Because each sensor 60 is below the antenna element 32, fiber optics may not be required since the sensors may be integrated closely with the detectors. A filter 52 may be provided to filter out extraneous energy to improve sensitivity to laser light. The output signals from the detectors in all the above disclosed embodiments are coupled to associated processors 42. The output of processor 42 is included in the output of the CLDGNS antenna 16 and provided to the control system 18 for further use and evaluation. It will be appreciated that the control 18 is shown in FIG. 1 as being located outside and remote from the antenna 16. In some instances, however, it may be desired to position the control 18 adjacent to, or inside, the antenna 16.

Figure 4:
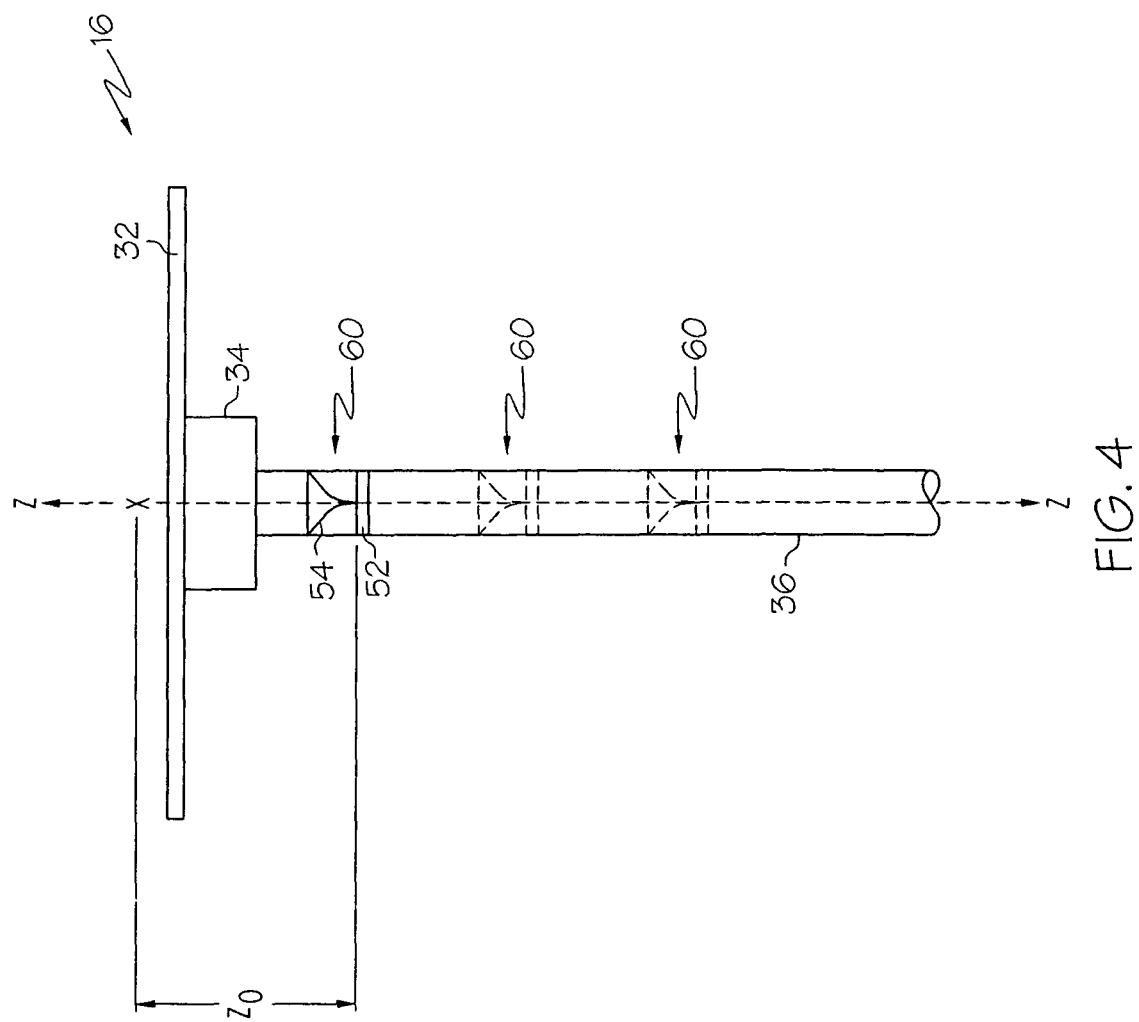

In the embodiment of FIG. 4, the sensors 60 may be provided at known positions along the support 36. Information provided by the sensors 60 can be used by the control system 18 to determine the distance from the transmitter 12 to the sensors 60, as well as the height difference of the sensors relative to the transmitter height reference 24. Since computation is well known to those skilled in the art, no further discussion is provided. This co-axial alignment simplifies implementation though non-co-axial implementations are also possible.

In the above disclosed embodiments of the CLDGNS antenna 16 (FIGS. 1-4), each of the laser detectors and the nominal phase center x of the antenna element are separated by a known, fixed distance and are generally aligned co-axially. In particular, the $Z_0$ distance (and the $X_0$, $Y_0$ distances, if necessary) of each optical sensor 44 relative to the nominal phase center x of the antenna element 32 are factory set. Accordingly, the CLDGNS antenna 16 improves the accuracy of the PTC system 10 by preventing an operator from manually entering a positional error into control system 18 due to a miscalculated measurement between the optical sensors of the laser detector and the nominal phase center x of the antenna element.

In the above embodiments, the CLDGNS antenna 16 is illustrated as having either a geodesic shape or a generally flat disc shape. However, it is to be appreciated that other satellite antennas may also be used advantageously with the concepts of the present invention.

Figure 5:
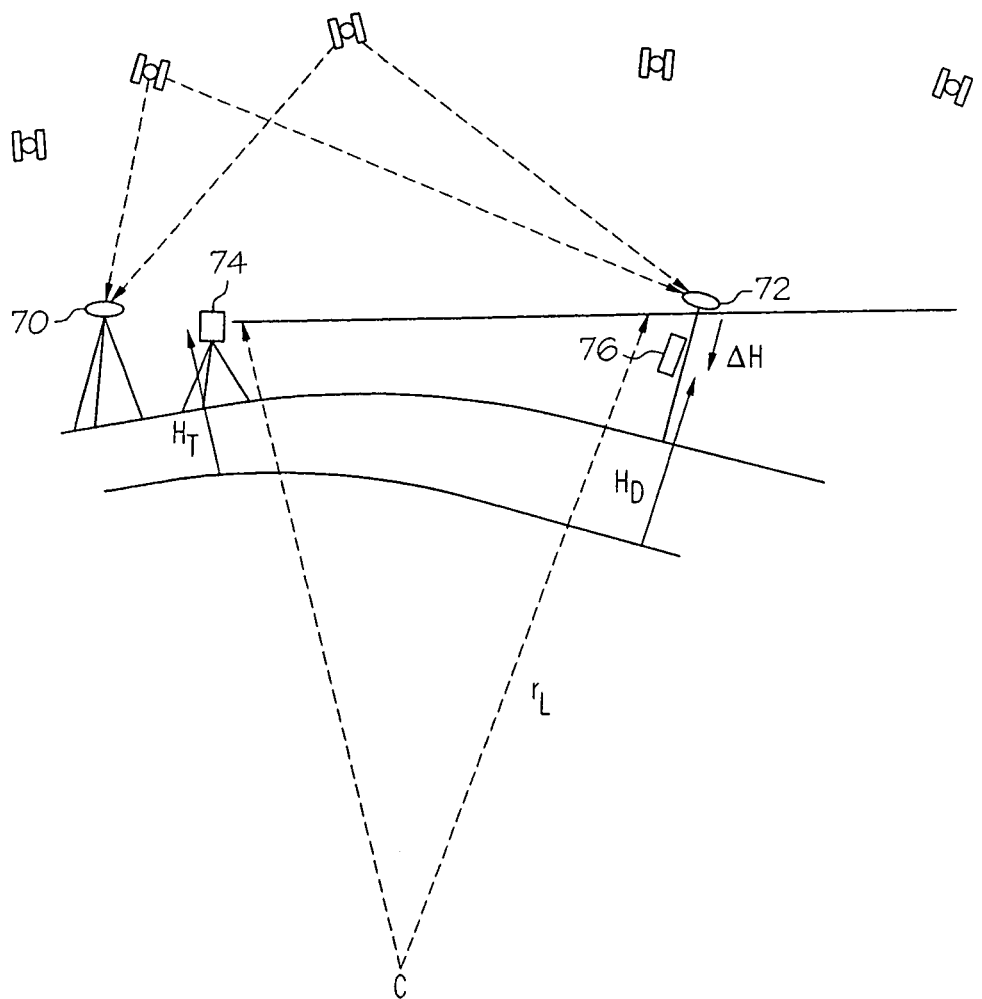
FIGS. 5-7 are schematic diagrams useful in explaining the manner in which data from the laser system and data from the global navigation satellite system are combined.

Reference is made to FIG. 5 which illustrates a GNSS and laser system. A base GNSS receiver 70 is located at a known mark and tracks the satellites in view. Range and/or carrier phase measurements are taken by the base receiver 70 and transmitted to the mobile or rover GNSS receiver 72. The mobile GNSS receiver 72 tracks two or more GNSS satellites that are also tracked by the base receiver 70. Alternatively, a network of base GNSS receivers can be used to generate a data stream that is largely corrected for atmospheric and satellite error sources. This approach is termed Network Real-Time Kinematic positioning and has position accuracy advantages over systems that use a single base receiver.

A laser transmitter 74 is located on site and provides suitable coverage for the laser detector 76. The elevation of the laser transmitter 70 relative to the same datum as the GNSS is known. In the case of GPS, the reference spheroid is the World Geodetic System 1984. The laser detector 76 senses the signals sent from the transmitter 74 and determines the difference in elevation relative to the transmitter 74. The laser transmitter aligns itself with the instantaneous direction of gravity and will not in general accord with the direction of a normal to the spheroid at the same point. Fortunately, the reference spheroid sufficiently well approximates the physical earth (mean sea level), particularly given that the operating range of the laser is less than 500 meters. As a result, the height difference obtained from the laser system, will be compatible with changes in height determined from the GNSS.

Let $r_1, r_2, \ldots r_s$ be the range observations from the mobile GNSS antenna to satellites $1, 2, \ldots s$. Observations from the base GNSS system are used to correct the mobile observations. The range observations can be considered as either code, or phase. In the case of phase, it is assumed that the carrier phase ambiguities have been removed.

The satellite coordinates are known and are obtained via an ephemeris, typically broadcast by each satellite. The satellite coordinates are given in terms of WGS84 XYZ Cartesian form (i.e., $X_i, Y_i, Z_i$, where $i=1, 2 \ldots s$).

Laser height readings taken at the mobile detector 76 provide the difference in elevation ($\Delta H$) to the Laser Transmitter. This height difference must then be applied to the height of the Laser transmitter above the reference spheroid ($H_T$) to obtain the height of the laser detector 76 above the spheroid ($H_D$). The distance from the center of the spheroid to laser detector 76 is computed by adding $H_T$ to the radius of curvature of spheroid at the mobile unit. Finally, the distance from the center of the spheroid to the GNSS antenna is generated by applying any height offset between laser detector 76 and antenna for the receiver 72—the final range measurement ($r_L$) is compatible with those obtained from GNSS. Hence, the laser height input can be considered as an additional satellite observation, with the satellite located at the center of the earth.

We next apply least squares estimation to estimate the X, Y, and Z coordinates of the mobile unit (plus the receiver clock bias term T). The observation equations needed for the process are common to both GNSS and laser data and can be presented in linearised form as:

$$l_i + v_i = Ax \quad (1)$$

where:

$l_i$ is a vector of observation minus computed terms for each satellite ($i=1, 2 \ldots s$) and the laser-detector ($i=L$). The approximate coordinates of the rover ($X_0, Y_0, Z_0$) are used to form the computed (theoretical) range values, $R_i$;

$v_i$ is a vector of observation residuals that recognize that the observations are not perfect, but are affected by small errors;

A is a design matrix that relates the observations with the unknowns; and x is a vector of corrections to the approximate rover antenna coordinates and the approximate GNSS receiver clock bias term ($T_0$).

The components of equation (1) are presented in full matrix form below:

$$\begin{bmatrix} r_1 - R_1 \\ r_2 - R_2 \\ \cdots \\ r_s - R_s \\ r_L - R_L \end{bmatrix} + \begin{bmatrix} v_1 \\ v_2 \\ \cdots \\ v_s \\ v_L \end{bmatrix} = \begin{bmatrix} a_1 & b_1 & c_1 & 1 \\ a_2 & b_2 & c_2 & 1 \\ \cdots & \cdots & \cdots & \cdots \\ a_s & b_s & c_s & 1 \\ a_L & b_L & c_L & 0 \end{bmatrix} \begin{bmatrix} \Delta X \\ \Delta Y \\ \Delta Z \\ \Delta T \end{bmatrix} \quad (2)$$

The design matrix terms $a_i, b_i, c_i$ are the direction cosines for the range observations from the rover antenna 72 to satellites (for GNSS observations) and from the rover antenna 72 to the center of the spheroid (for laser observations). The direction cosines are computed using:

$$a_i = \frac{-(X_i - X_0)}{R_i}; \quad b_i = \frac{-(Y_i - Y_0)}{R_i}; \quad c_i = \frac{-(Z_i - Z_0)}{R_i}; \quad (3)$$

Each observation presented in equation (1) has an associated uncertainty. In the case of the GNSS phase observations, this is normally on the order of a centimeter. In the case of laser height readings, it is on the order of a few millimeters. Hence, an observation weight matrix is introduced that is formed by the inverse of the individual observation variances:

$$P = \begin{bmatrix} p_1 & 0 & \cdots & 0 & 0 \\ 0 & p_2 & \cdots & 0 & 0 \\ \cdots & \cdots & \cdots & \cdots & \cdots \\ 0 & 0 & & p_s & 0 \\ 0 & 0 & & 0 & p_L \end{bmatrix} \quad (4)$$

Based on the principle of least squares, the most-probable value of the corrections to the unknowns are obtained by minimizing the sum of the squares of the weighted observation residuals according to:

$$x = (A^T P A)^{-1} (A^T P l) \quad (5)$$

Finally, the corrected coordinates and clock bias term (denoted with a superscript ^) of the rover are obtained by applying the result of equation (5) to the respective approximate values used as the linearization point for the adjustment:

$$\begin{bmatrix} \hat{X} \\ \hat{Y} \\ \hat{Z} \\ \hat{T} \end{bmatrix} = \begin{bmatrix} X_0 \\ Y_0 \\ Z_0 \\ T_0 \end{bmatrix} + \begin{bmatrix} \Delta X \\ \Delta Y \\ \Delta Z \\ \Delta T \end{bmatrix} \quad (6)$$

Figure 6:
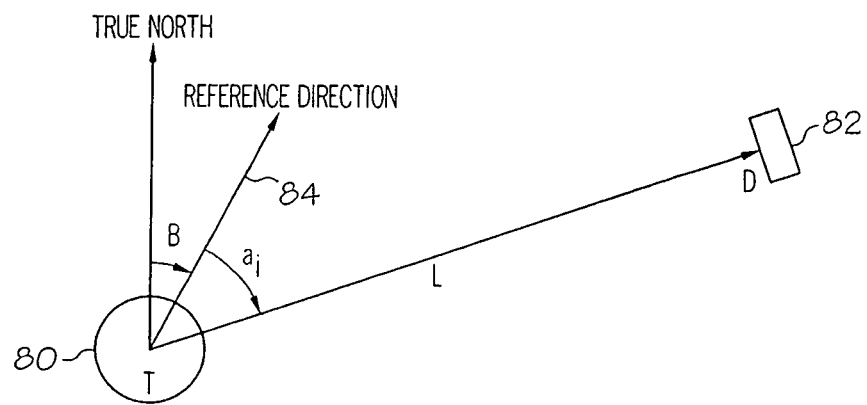

The laser system may include the facility to form measurements of horizontal angles referenced to a fixed direction such as north. Reference is made to FIG. 6. Every time the rotating laser passes a reference mark, a unidirectional bank of LEDs are illuminated at the laser transmitter 80. At the laser detector 82, the time between the next laser strike and the LED illumination provides a measure of the angular displacement of the detector from the reference line, given that the rotation rate of the laser transmitter 80 is measured and therefore is known.

In FIG. 6, the laser transmitter 80 is arbitrarily aligned such that there is an angular displacement of the device with respect to true north of B degrees. Readings of the angle between the transmitter reference line 84 and the detector 82 are available on each sweep of the laser and are denoted by $a_i$. The location of the transmitter 80 is given in terms of three dimensional Cartesian coordinates by $X_T, Y_T,$ and $Z_T$, while the detector coordinates are X, Y, and Z, as before.

The angular readings may be input as positional observations into the overall estimation scheme used in a combined laser/GNSS system. The least squares approach can be once again applied. For simplicity, consider the unknown coordinates of the detector in terms of a horizontal plane centered on the transmitter 80. Let $E_T, N_T$ be the planar coordinates of the transmitter and E, N, the coordinates of the detector. The observation equation that links the angular observations with the detector coordinates is given below:

$$a_i + w_i = \tan^{-1}\left(\frac{E - E_T}{N - N_T}\right) - B \quad (7)$$

Each angular observation is subject to a small, random error $w_i$. It is possible that the laser transmitter will be manually aligned to north in the field, in which case B will be identically zero. For the purposes of the discussion, below, it is worthwhile considering B as an unknown parameter that can be determined via the integration of GPS and laser devices.

The three unknown parameters in equation (7) are E, N, and B:

$$a_i = f(E, N, B) \quad (8)$$

In order to apply the theory of least squares we must linearize the observation equation:

$$a_i = f(E_0, N_0, B_0) + \frac{df}{dE}\Delta E + \frac{df}{dN}\Delta N + \frac{df}{dB}\Delta B \quad (9)$$

where $E_0$, $N_0$, and $B_0$, are initial guesses for the values of E, N and B, respectively; df/dE, df/dN, and df/dB are the partial derivatives of the function with respect to each unknown parameter; and $\Delta E$, $\Delta N$, and $\Delta B$ are corrections to the initial estimates $E_0$, $N_0$, and $B_0$, that lead to the most probable values of the unknowns. Written out in matrix form, equation (9) becomes:

$$[a_i - \alpha_0] + [w_i] = \begin{bmatrix} \frac{df}{dE} & \frac{df}{dN} & \frac{df}{dB} \end{bmatrix} \begin{bmatrix} \Delta E \\ \Delta N \\ \Delta B \end{bmatrix} \quad (10)$$

with $\alpha_o$ the computed angle based on the approximate coordinates of the detector. That is, by inserting $E_0$ for E, $N_0$ for N, and $B_0$ for B in equation (7), we obtain $\alpha_o$.

If our initial guess for E, N and B is very good, then $\alpha_o$ will be very close to the actual observed angle $\alpha_i$.

The partial derivatives of the observation equation with respect to the unknowns are given by:

$$\frac{df}{dE} = \frac{(N - N_T)}{(E - E_T)^2 + (N - N_T)^2} = \frac{(N - N_T)}{L^2} \quad (11)$$

$$\frac{df}{dN} = \frac{-(E - E_T)}{L^2} \quad (12)$$

$$\frac{df}{dB} = -1 \quad (13)$$

A single angle observation from a single transmitter is insufficient for determining the location of the detector. With multiple transmitters, the intersection of two angular observations suffices.

Equation (2) shows the matrix form of GNSS and laser observations being used to estimate the unknown coordinates of the detector antenna. Now we wish to integrate the angular observations into the combined solution for the coordinates of the detector and therefore we need to convert the angular observation development from the E, N plane system to X, Y, and Z Cartesian coordinates. The two coordinate systems are related via the following rotation matrix:

$$\begin{bmatrix} (E - E_T) \\ (N - N_T) \\ (U - U_T) \end{bmatrix} = \begin{bmatrix} -\sin\lambda & -\cos\lambda & 0 \\ -\sin\phi\cos\lambda & -\sin\phi\sin\lambda & \cos\phi \\ \cos\phi\cos\lambda & \cos\phi\sin\lambda & \sin\phi \end{bmatrix} \begin{bmatrix} (X - X_T) \\ (Y - Y_T) \\ (Z - Z_T) \end{bmatrix} \quad (14)$$

The rotation matrix contains trigonometric values relating to the latitude ($\phi$), and longitude ($\lambda$) of the transmitter. Equation (14) can be used in equation (7) to produce a new angle observation equation that relates to the same coordinate system as that used for GNSS data:

$$a_i + w_i = \tan^{-1}\left(\frac{-\sin\lambda(X - X_T) - \cos\lambda(Y - Y_T)}{-\sin\phi\cos\lambda(X - X_T) - \sin\phi\sin\lambda(Y - Y_T) + \cos\phi(Z - Z_T)}\right) - B \quad (15)$$

In equation (15), the $X_T$, $Y_T$, $Z_T$ and $\phi$, $\lambda$ coordinates of the transmitter are assumed to be known and are a function of: X, Y, Z and B:

$$a_i + w_i = g(X, Y, Z, B) \quad (16)$$

A linearization process is used to produce an observation equation that can be applied in a least squares estimation scheme:

$$a_i + w_i = g(X_0, Y_0, Z_0, B_0) + \frac{dg}{dX}\Delta X + \frac{dg}{dY}\Delta Y + \frac{dg}{dZ}\Delta Z + \frac{dg}{dB}\Delta B \quad (17)$$

The partial derivatives in equation (17) involving trig functions are straightforward to compute, and are therefore omitted here.

We now have all of the components needed to state the matrix form of the observation equations for combined GNSS, laser height and laser direction data:

$$\begin{bmatrix} r_1 - R_1 \\ r_2 - R_2 \\ r_s - R_s \\ r_L - R_L \\ a - \alpha \end{bmatrix} \begin{bmatrix} v_1 \\ v_2 \\ v_s \\ v_L \\ w \end{bmatrix} = \begin{bmatrix} a_1 & b_1 & c_1 & 1 & 0 \\ a_2 & b_2 & c_2 & 1 & 0 \\ a_s & b_s & c_s & 1 & 0 \\ a_L & b_L & c_L & 1 & 0 \\ h & j & k & 0 & -1 \end{bmatrix} \begin{bmatrix} \Delta X \\ \Delta Y \\ \Delta Z \\ \Delta T \\ \Delta B \end{bmatrix} \quad (18)$$

where the horizontal direction partial derivatives with respect to X, Y and Z are given by h, j and k, respectively.

An observation weight must be assigned to the angle measurement shown in equation (18). Then, the best estimates of the corrections to the coordinates, GNSS receiver clock, and laser transmitter orientation are obtained using the matrix expression (5). Finally, the best estimates of the parameters are computed by applying the corrections to their approximate values:

$$\begin{bmatrix} \hat{X} \\ \hat{Y} \\ \hat{Z} \\ \hat{T} \\ \hat{B} \end{bmatrix} = \begin{bmatrix} X_0 \\ Y_0 \\ Z_0 \\ T_0 \\ B_0 \end{bmatrix} + \begin{bmatrix} \Delta X \\ \Delta Y \\ \Delta Z \\ \Delta T \\ \Delta B \end{bmatrix} \quad (19)$$

Figure 7:
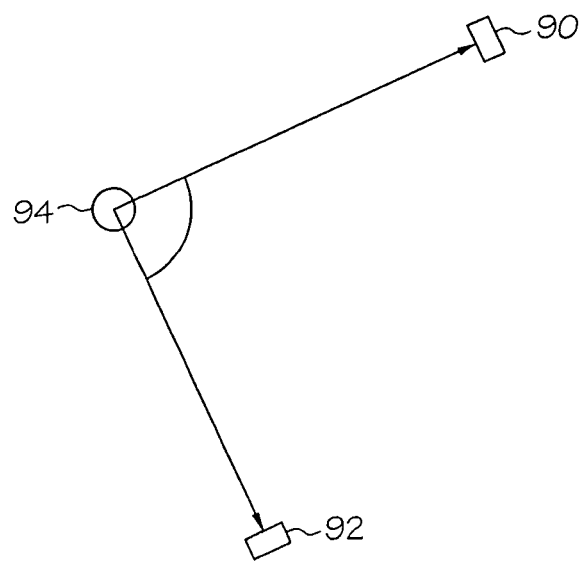

The aforementioned process is based around the assumption that the position of the laser transmitter, i.e., its height and location, is known. One benefit of a combined laser and GNSS system, is that it can be self-calibrating. Instead of solving for just the position of the detector antenna (plus clock and orientation nuisance parameters), it is possible to include the three dimensional position of the laser transmitter as an unknown, as well. As shown in FIG. 7, laser and GNSS position readings must be taken at more than two non-collinear points 90, 92 (i.e., two points that are not aligned) around the transmitter 94 to be able to compute the transmitter location. Preferably, many readings can be taken at a range of points surrounding the transmitter to be able to average out GNSS random errors and small systemic error sources. Where possible, the detector should be placed at points that establish roughly a 90 degree angle at the transmitter. This gives a good fix on the transmitter location.

Consider, for example, the situation in which a motorgrader is operating under control of a GNSS system, and it approaches a section of a roadbed where it will pass beneath an overpass or other overhead obstruction. With the present invention, the operator of the motorgrader or fellow workers will place a laser transmitter, or perhaps more than one such transmitter, at appropriate points adjacent the overpass such that the laser light will illuminate the laser detector on the motorgrader for some distance before the motorgrader reaches the overpass. The position for the transmitter is selected so that it the laser beam detector will receive the beam from the transmitter as the motorgrader passes under the overpass, as well.

The GNSS system will then be used to compute the position of the each of the laser transmitters. This is done by repeatedly computing the position of motorgrader using the signals from the GNSS system, and then determining the directional vector from the motorgrader to the transmitter based on the laser system. The multiple vectors will intersect at the position of the transmitter. This information will then be stored by the system so that when the motorgrader moves under the overpass and some of the satellites are not visible to the receiver, the position of the system can be computed from the signals provided by the few satellites that may be visible at any instant in conjunction with the signals from the laser detector.

It will be appreciated that to establish the position of a laser transmitter, laser and GNSS position readings are taken at a number of non-collinear positions, i.e. positions that do not fall on the same straight line from transmitter. As indicated in FIG. 7, the accuracy of this assessment will, in part, be determined by the angle between the converging vectors. Further, taking more than two directional readings may improve accuracy.

Figure 8:
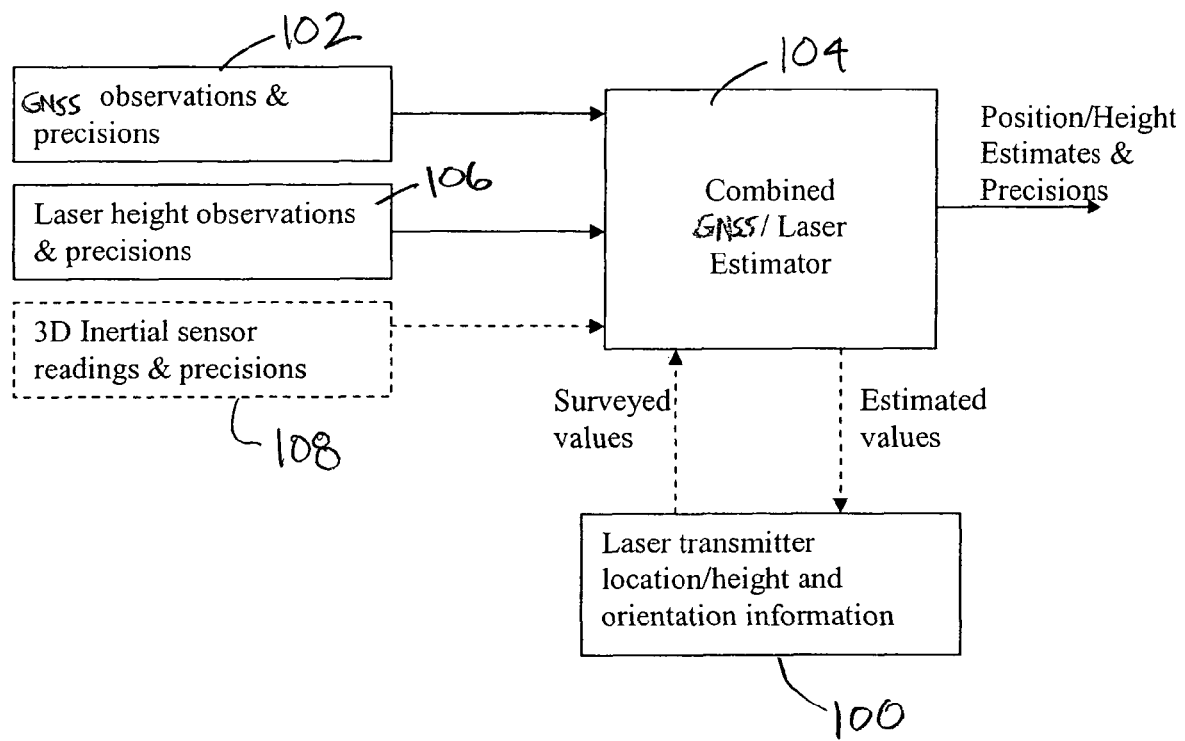
FIG. 8 is a schematic diagram which illustrates the manner in which the GPS based data and the laser based data may be combined.

The measured position of each of the transmitters is stored for use when the motorgrader passes under the overpass, and the positioning and control systems view of the GNSS satellites is obstructed to some degree. As shown in FIG. 8, this information may be stored in memory 100. The GNSS observations and precisions may be provided at 102 to the estimator device 104, along with the laser system observations and precisions at 106. The device 104 then uses the signals received from laser detector at 106 to improve the estimate of position of the machine based on signals from the GNSS receiver. It will be appreciated that other position data may also be combined by the estimator device 104 with data from the GNSS receiver to enhance or improve the estimate of position. FIG. 8 indicates that, in an optional variation of the embodiment, inertial sensor readings and precisions may also be provided to the estimator device 104 for inertial system 108. Estimator device 104 is preferably implemented as a programmed computer functioning as a Kalman filter. A Kalman filter is a recursive digital algorithm that can be used to combine estimate data of varying levels of uncertainties. The Kalman filter simply combines the position data which is available and, based upon the anticipated error levels, provides position estimates.

GNSS observations are normally made at regular time intervals or epochs. Laser readings are dictated by the rotation rate of the transmitter and therefore may not exactly coincide with the GNSS observations. There are several ways of handling this situation, assuming that the movement of the receiver is rapid enough that an error may result from a lack of synchronization. First, the rotation rate of the laser transmitter may be increased so that a reading can be taken which is sufficiently close to a GNSS epoch that negligible error in position results. Second, the motion of the rover can be modeled in a Kalman filter and the GNSS and laser detector observations can be fed into the filter whenever they occur. Third, the rate of change of the GNSS or laser observations can be modeled so that the observations can be skewed to a common epoch. In any case, the GNSS and laser observations can be readily processed together in a consistent manner.

It will be appreciated that other variations may be of the position determining system may be utilized. For example, systems are contemplated in which the estimator 104 is responsive to a GNSS receiver 102, and to an inertial sensor system 108, with no laser transmitter and receiver being used. Alternatively, a system may incorporate a GNSS receiver and a laser transmitter and receiver 106, without an inertial system. Finally, a position determining system may use laser generated position data in combination with inertial sensor data, without GNSS observations. In each variation, position data from two or three different sources are combined in a Kalman filter to provide a position estimate that is not degrade to the degree that might occur if a single source for the position data were used operating conditions reduced the accuracy of that single source. As explained previously, using a laser receiver to detect position for a motorgrader in conjunction with a GNSS receiver will help maintain accurate position determination in those instances when the motorgrader moves into an area in which some of the GNSS satellites can not be received by the GNSS receiver. In like manner, an inertial sensor may be used in place of, or in conjunction with the laser receiver, maintain the accuracy of the determined position. Further, because of the structures around which the motorgrader is operated, the laser receiver may be blocked temporarily from receiving the transmitted laser beam or beams. The GNSS receiver output and the inertial sensor output may be combined to determine position during these times.

The laser transmitter has been illustrated as a transmitter of the type that provides a pair of canted fan beams of light and a periodic 360° flash of light to give a receiver an indication of relative position with respect to the transmitter. The present invention contemplates other types of laser transmitters and receivers, as well, including transmitters which sweep a thin beam of laser light through a generally horizontal plane and receivers which have multiple detectors for detecting the relative position of the plane of laser light. Other variations include using a transmitter that projects a single fan-shaped beam of laser light, preferably canted, and a periodic 360° flash of light to give relative position. The laser receiver and GNSS antenna have been illustrated as being located very close together on a single mast. It will be appreciated, however, that this need not be the case, as long as the distance between the laser receiver and the GNSS antenna are a known constant distance apart, and this displacement is taken into account in position determination calculations.

Figure 9:
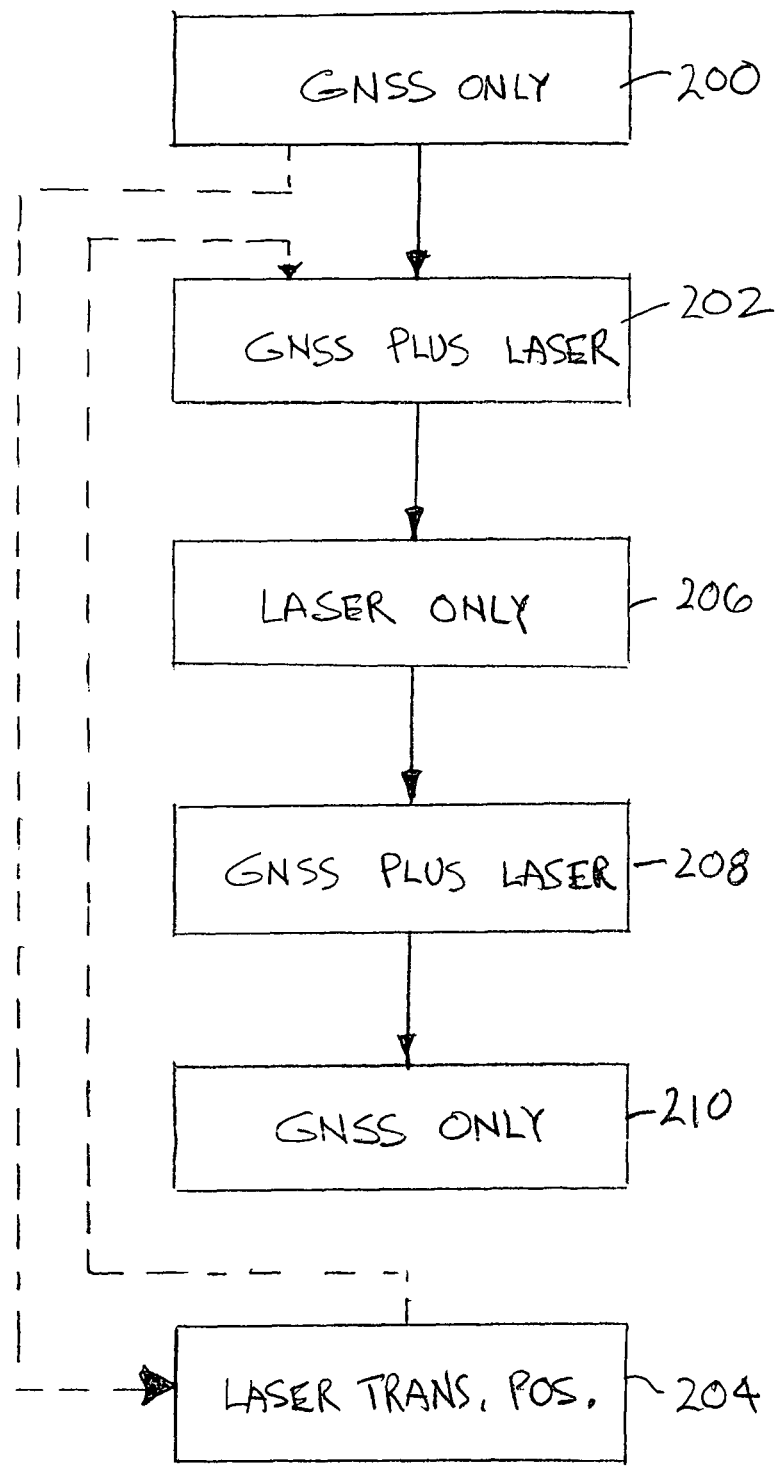
FIG. 9 is a flow chart illustrating the operation of the position tracking and control system of the present invention in use on a motorgrader.

Reference is now made to FIG. 9, which is a flow chart that illustrates diagrammatically the manner in which one embodiment of the present may operate to transition between operating only under control of the GNSS receiver to operating under control of the GNSS receiver and the laser beam receiver. In this embodiment, the control system utilizes a laser transmitter positioned at a known location, a GNSS satellite system, a laser beam receiver mounted on the machine, and a GNSS receiver mounted on the machine.

For example, the GNSS receiver and the laser beam receiver may both be mounted on a motorgrader which is moving toward, and about to pass beneath an overpass. One or more laser transmitters are positioned near the overpass area and are projecting one or beams so as to illuminate at least a portion of the area beneath the overpass. As indicated at 200, the control system may be operating essentially under control of the GNSS receiver, comparing the measured position of the motorgrader and its grading implement to the desired level of the graded surface. As the motorgrader reaches a point where the satellites are partially blocked from view, the position calculation will be based on both the laser and GNSS data, as indicated at 202. The system will, of course, need to know the position of the laser transmitter or transmitters so that the motorgrader relative position can be translated into an absolute position calculation. If desired, the positions of laser transmitters may be surveyed in a conventional manner and the position data stored. Alternatively, the relative laser transmitter positions may be determined as indicated at 204 by the system itself while the GNSS data is compete. The system provides a reference coordinate system that is common to both the laser transmitter and the laser receiver, and the GNSS satellite system and the GNSS receiver.

The machine may move to a point at which the GNSS receiver is no longer receiving useable data from the GNSS satellites. At this point, the calculation of the position of the machine will be determined solely by the laser receiver and the laser transmitters, as indicated at 206. After the motorgrader passes under the overpass, the GNSS receiver will again acquire signals from GNSS satellites and the system will operate on the combined signals, as indicated at 208. Finally, the motorgrader will pass out of range of the laser transmitters and the GNSS receiver will provide position information without assistance. It will be appreciated that the information from the GNSS receiver and the laser receiver will be combined, as with a Kalman filter to produce the estimate of the machine position. The motorgrader will then be operated and controlled based on the estimated actual machine position and the desired machine position.

Although the present invention has been described in terms of the presently preferred embodiments, it is to be understood that the disclosure is not to be interpreted as limiting. For example, the optical sensor and the GNSS antenna are described as being mounted on the machine in one embodiment, and this is intended to include mounting these components on the body of the machine, or on the machine implement for movement therewith. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A system for determining three-dimensional position defined by three coordinates, comprising
    a laser transmitter that projects at least one laser beam that rotates about a generally vertical axis,
    a GNSS receiver for determining position, the GNSS receiver having a GNSS antenna,
    an optical sensor for receiving the laser beam, said optical sensor being in fixed position with respect to the phase center of said GNSS antenna, and
    a device receiving signals from the GNSS receiver and signals from the optical sensor to determine and store the three-dimensional position defined by three coordinates of the transmitter from said signals, said device thereafter utilizing signals received from the optical sensor and from the GNSS receiver to determine the three-dimensional position defined by three coordinates of said GNSS receiver, each of said three coordinates defining the three-dimensional position of said transmitter and the three-dimensional position of said GNSS receiver being determined by signals from both of said GNSS receiver and said optical sensor.

2. The system of claim 1 in which said laser transmitter projects one or more shaped beams of laser light to which the optical sensor is responsive.

3. The system of claim 1 in which said device combines the outputs from said sensor and said receiver using least squares averaging.

4. The system of claim 1 in which said device includes a Kalman filter for determining the most likely position, based on the detection signals from the optical sensor and the GNSS receiver.

5. The system of claim 1 in which the position of the transmitter is determined from receipt of said laser beam including rotation angle of the beam when received by said sensor and the distance between the transmitter and the GNSS receiver.

6. The system of claim 1 in which said device utilizes signals received from the optical sensor and from the GNSS receiver to determine the vertical position of said GNSS receiver.

7. A system for determining the three-dimensional position of a machine defined by three coordinates and controlling the machine, comprising
    a laser transmitter, positioned at a three-dimensional reference position defined by three coordinates, that projects two or more fan-shaped laser beams and rotates the laser beams about a generally vertical axis, the two or more fan-shaped laser beams diverging in non-parallel, non-horizontal planes, with the line of intersection of these non-parallel, non-horizontal planes being non-vertical,
    a GNSS receiver on the machine for determining the three-dimensional position of the machine defined by three coordinates, the GNSS receiver having a GNSS antenna mounted on the machine,
    an optical sensor mounted on the machine for receiving the fan-shaped laser beams, said optical sensor being coaxial with, and at, or displaced a small distance from, the phase center of said GNSS antenna, and
    a device on the machine, receiving signals from the GNSS receiver and signals from the optical sensor to determine the three-dimensional position of the transmitter defined by three coordinates, said device thereafter utilizing signals received from the optical sensor and the GNSS receiver to determine the three-dimensional position of the machine defined by three coordinates from said signals, and for providing a control signal, each of said three coordinates defining the three-dimensional position of said transmitter and the three-dimensional position of said GNSS receiver being determined by signals from both of said GNSS receiver and said optical sensor.

8. The system of claim 7 in which said GNSS antenna and said optical sensor are located on the same mast in close proximity, said GNSS receiver and said optical sensor being integrated into a single unit and having a common power supply, said GNSS antenna and said optical sensor being separated by a known, fixed distance.

9. The system of claim 7 in which said device includes a Kalman filter for determining the most likely position of said machine, based on the detection signals from the optical sensor and the GNSS receiver.

10. A system for determining the three-dimensional position of a machine defined by three coordinates, comprising
a laser transmitter that projects at least one laser beam and rotates the at least one laser beam about a generally vertical axis,
a GNSS receiver on the machine for determining the position of the machine, the GNSS receiver having a GNSS antenna mounted on the machine,
an optical sensor mounted on the machine for receiving the at least one laser beam, said optical sensor being located in known positional relationship to the phase center of said GNSS antenna, and
a device on the machine, receiving signals from the GNSS receiver and signals from the optical sensor to determine the three-dimensional position of the machine defined by three coordinates, said device including a Kalman filter, for determining the most likely position of the machine defined by three coordinates from said signals from said GNSS receiver and said optical sensor, each of said three coordinates defining the three-dimensional position of the machine being determined based on signals from both of said GNSS receiver and said optical sensor.

11. The system of claim 10 in which the position of said laser transmitter is determined from the rotation angle of the beam when received by said sensor and the distance between said transmitter and said GNSS receiver.

12. The system of claim 10 in which said GNSS antenna and said optical sensor are located on the same mast in close proximity, said GNSS receiver and said optical sensor being integrated into a single unit and having a common power supply, said GNSS antenna and said optical sensor being separated by a known, fixed distance.

13. The system of claim 10 in which a least squares approximation is utilized to determine the most likely position, based on the signals from the optical sensor and the GNSS receiver.

14. The system of claim 10 in which said GNSS antenna and said optical sensor are mounted on said machine in close, fixed proximity to each other, and in which said GNSS antenna and said optical sensor are mounted for movement with an implement of said machine.

15. The system of claim 14 in which said device on the machine effects control of the position of said implement based on an estimated position provided by said Kalman filter, and based on a desired position.

16. A system for determining the three-dimensional position of a machine defined by three coordinates and controlling the machine, comprising
a laser transmitter, positioned at a reference position, that projects one or more laser beams,
a GNSS receiver on the machine for determining the position of the machine, the GNSS receiver having a GNSS antenna mounted on the machine,
an optical sensor mounted on the machine for receiving the one or more laser beams, said optical sensor being coaxial with, and displaced a small distance from, the phase center of said GNSS antenna, said GNSS receiver and said optical sensor being integrated into a single unit and having a common power supply, said GNSS antenna and said optical sensor being separated by a known, fixed distance,
an inertial sensor on machine for providing an output indicating movement and position of the machine, and
a device on the machine, receiving a signal from the GNSS receiver, a signal from the optical sensor, and an output from the inertial sensor, to determine the most likely three-dimensional position of the machine defined by three coordinates from said signals and output, each of said three coordinates of said three-dimensional position being determined based on each of said signals and said output, and for providing a control signal to control operation of said machine.

17. The system of claim 16 in which said laser transmitter projects a pair of fan shaped beams of laser light, and in which the optical sensor is responsive to both of said beams for determining the position.

18. The system of claim 16 in which said GNSS antenna and said optical sensor are located on the same mast in close proximity.

19. The system of claim 16 in which a least squares approximation is utilized to determine the most likely position, each coordinate of said most likely position being based on the detection signals from the optical sensor and the GNSS receiver.

20. The system of claim 16 in which said device includes a Kalman filter for determining the most likely position of said machine, each coordinate of said most likely position being based on the detection signals from the optical sensor and from the GNSS receiver.

21. The system of claim 16 in which the position of said laser transmitter is determined from the rotation angle of the beam when received by said optical sensor and the distance between said transmitter and said GNSS receiver.

22. In a machine control system utilizing a fixed position laser transmitter, a GNSS satellite system, a laser beam receiver mounted on the machine, and a GNSS receiver mounted on the machine, for position determination and guidance control of said machine, a method for transitioning between operating only under control of said GNSS receiver to operating under control of both said GNSS receiver and said laser beam receiver, comprising the steps of:
providing a reference coordinate system that is common to both said laser transmitter and said laser receiver, and to said GNSS satellite system and said GNSS receiver; and
providing a processor system on said machine configured to receive position information from said laser receiver, and to receive position information from said GNSS receiver, and
applying information from said laser receiver and information from said GNSS receiver to a Kalman filter to produce an estimate of three-dimensional machine position defined by three coordinates, each of said three coordinates being based on information from both said laser receiver and information from said GNSS receiver, and
controlling operation of the machine based on actual machine position and on desired machine position.

23. The method of claim 22 further comprising the step of applying information from an inertial sensor on said machine to said processor system.

* * * * *